Sept. 1, 1931. L. C. DUTRO 1,821,010
LUBRICATOR
Filed Sept. 12, 1925

INVENTOR.
LESLIE C. DUTRO
BY Munn & Co.
ATTORNEYS.

Patented Sept. 1, 1931

1,821,010

UNITED STATES PATENT OFFICE

LESLIE C. DUTRO, OF LONG BEACH, CALIFORNIA

LUBRICATOR

Application filed September 12, 1925, Serial No. 56,048, and in South Africa October 16, 1924.

My invention relates to lubricators of the general type embodying a reservoir or cup from which a fluid lubricant is automatically supplied under the expansive action of air to a bearing when the latter becomes overheated. My invention relates more particularly to the type of lubricator embodied in my co-pending application Serial No. 23,142 filed April 14, 1925, now Patent No. 1,735,266, wherein a fluid lubricant reservoir is provided having a filling tube and well therein from which latter the lubricant under the expansive action of air in the lubricator is ejected to the bearing when the latter becomes overheated, and successively through a feed tube and a discharge nipple; and, conversely, as the bearing cools and the air contracts, the lubricant will be drawn from the nipple, feed tube and well back into the reservoir or cup followed by atmospheric air from the bearing to fill the nipple and tube. When associated with a relatively tight bearing, a lubricator of this character fails to properly function, because the tight bearing prevents atmospheric air from being drawn into the nipple, feed tube and well so that the return of lubricant to the reservoir is prevented, thus causing a continued and needless feeding of lubricant to the bearing.

It is a purpose of my present invention to provide a lubricator which overcomes the objection recited by providing a vent port through which atmospheric air is supplied to the lubricator, irrespective of the tightness of any bearing with which it may be associated, whereby the positive return of the lubricant to the reservoir is insured and with it the cessation of flow of lubricant to the bearing, as intended.

I will describe only two forms of lubricator embodying my invention and will then point out the novel features thereof in claims.

In the accompanying drawings.

Figure 1:
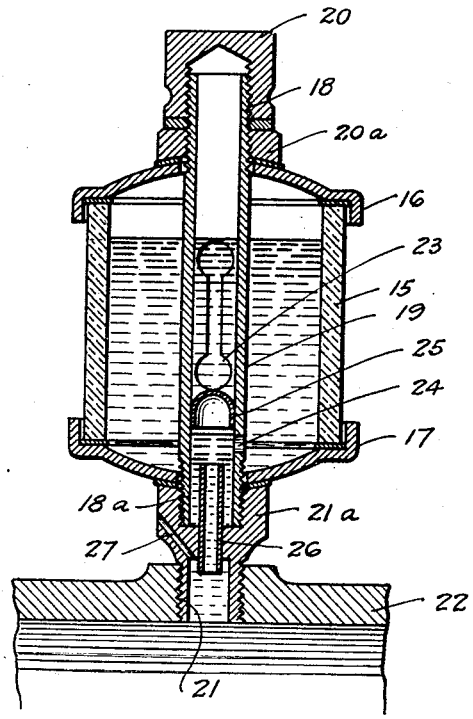
Figure 1 is a view showing in vertical section one form of lubricator embodying my invention in applied position to a bearing.

Referring specifically to the drawings, in which similar reference characters refer to similar parts in each of the views, my invention, in the embodiment shown in Figure 1, comprises an air-tight cup constituting the lubricant reservoir and including a hollow cylindrical body 15, preferably formed of glass and closed at opposite ends by flanged caps 16 and 17 having axial openings through which the threaded ends 18 and $18^a$ of a filler tube 19 extend, with the upper end 18 engaged by a cap nut 20 for closing the upper end of the tube, and superimposed with respect to a nut $20^a$ in embracing relation to the upper cap 16. The lower end $18^a$ of the filler tube engages within a threaded socket $21^a$ of a mounting and discharge nipple 21, the nipple being exteriorly threaded for engagement within a suitable opening of a bearing 22 to support the lubricator as a unit upon the bearing. The nipple and nut $20^a$ co-operate in securely holding the caps 16 and 17 in closing relation to the body 15, and with the interposing of gaskets between the several joints an air-tight reservoir is formed in which the lubricant to be used is stored.

Within the body 15 the filler tube 19 is provided at diametrically opposed points with elongated orifices 23, which permit oil from the body to pass inwardly of the tube. The tube 19 is also formed with a relatively small orifice 24 at a point below orifices 23, and within the tube between the two orifices is arranged a plug 25 which co-operates with the tube and the socket $21^a$ of the nipple 21 to form a well to which oil from the reservoir is supplied through the orifice 24. A feed tube 26 is secured within the restricted portion of the nipple 21 so as to extend upwardly into the well, and through this tube oil is adapted to be fed to the nipple and ultimately to the bearing.

As clearly illustrated in Figure 1, the nipple 21, or rather the socket $21^a$ thereof, is formed with a vent duct 27 which functions to admit atmospheric air to the nipple, irrespective of any air which may be supplied to the nipple from along the bearing whereby the proper operation of the lubricator is effected.

In operation, the body 15 is partly filled with lubricant so as to leave an air chamber above the body of oil, the oil passing inwardly of the filler tube through the orifices 23 and into the well through the orifice 24. When the bearing 22 is cool, the body of oil is inert because of the balance of air pressure thereon. However, when the bearing becomes overheated, the heat so generated causes the air within the body to expand, thus exerting sufficient pressure on the body of oil to force the latter outwardly of the feed tube and through the nipple to the bearing, so as to properly lubricate and thus effect cooling of such bearing. As soon as the bearing becomes cool, the air in the reservoir contracts to its normal pressure, thus permitting the pressure of the atmospheric air to be exerted on the oil through the nipple and feed tube, whereby the oil will be forced back into the well until the air pressures are balanced, thus discontinuing the feeding of oil to the bearing.

With the lubricator associated with a relatively loose bearing, atmospheric air is free to pass into the nipple from within the bearing, but should the bearing be relatively tight to prevent the supply of air to the nipple in this manner, air will be supplied to the nipple through the vent duct 27, thus insuring the positive return of the lubricant to the well and with it the cessation in flow of lubricant to the bearing.

Figure 2:
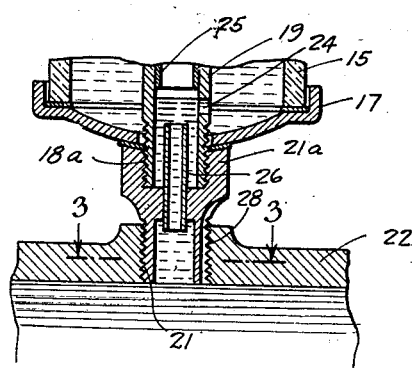
Figure 2 is a fragmentary view showing in vertical section another form of lubricator embodying my invention in applied position to a bearing.
Figure 3:
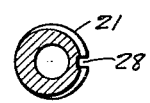
Figure 3 is a transverse sectional view taken on the line 3—3 of Figure 2.

Referring now to Figure 2, I have here shown another form of lubricator embodying my invention which is identical in construction with the lubricator shown in Figure 1, with the exception that the nipple is formed exteriorly with a groove 28 which, in its association with the bearing 22, provides a duct for admitting atmospheric air to the nipple independently of the bearing, thus insuring the proper discontinuance in supply of lubricant to the bearing.

Although I have herein shown and described only two forms of lubricator embodying my invention, it is to be understood that various changes and modifications may be made therein without departing from the spirit of the invention and the spirit and scope of the appended claims.

I claim as my invention:

1. A lubricator comprising a lubricant reservoir, means for mounting the reservoir on a bearing, means responsive to the expansive action of air in the reservoir to feed lubricant from the reservoir to the bearing and to return the lubricant in the expansion responsive means to the reservoir when the air in the reservoir, contracts to its normal pressure by admitting air thereto from the bearing, and means for admitting to the expansion responsive means atmospheric air other than that from the bearing should the latter be sufficiently tight to prevent the admission of air to the expansion responsive means.

2. A lubricator comprising a lubricant reservoir, means for mounting the reservoir on a bearing, means responsive to the expansive action of air in the reservoir to feed lubricant from the reservoir to the bearing and to return the lubricant in the expansion responsive means to the reservoir when the air in the reservoir contracts to its normal pressure by admitting air thereto from the bearing, and a vent duct communicating at all times with the expansion responsive means for admitting thereto, atmospheric air other than that from the bearing should the latter be sufficiently tight to prevent the admission of air to the expansion responsive means.

3. A lubricator as embodied in claim 2 wherein the means for mounting the reservoir on a bearing comprises a nipple through which lubricant from the reservoir is discharged, and said vent duct is disposed in the nipple and is in communication with the interior thereof.

LESLIE C. DUTRO.